(12) United States Patent
Pearce et al.

(10) Patent No.: US 9,935,874 B2
(45) Date of Patent: Apr. 3, 2018

(54) FIBRE CHANNEL GATEWAY SYSTEM

(71) Applicant: Dell Products L.P., Round Rock, TX (US)

(72) Inventors: Jason Garth Pearce, Round Rock, TX (US); Kevin Allen Hughes, Cedar Park, TX (US); T. Bryan Varble, Round Rock, TX (US); Jeffrey S. Kirk, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 316 days.

(21) Appl. No.: 14/937,590

(22) Filed: Nov. 10, 2015

(65) Prior Publication Data

US 2016/0065387 A1 Mar. 3, 2016

Related U.S. Application Data

(63) Continuation-in-part of application No. 14/295,999, filed on Jun. 4, 2014, now Pat. No. 9,667,753.

(51) Int. Cl.
| | |
|---|---|
| *H04L 12/28* | (2006.01) |
| *H04L 12/56* | (2006.01) |
| *H04L 12/721* | (2013.01) |
| *H04L 12/24* | (2006.01) |
| *H04L 12/751* | (2013.01) |

(52) U.S. Cl.
CPC .......... *H04L 45/66* (2013.01); *H04L 41/0226* (2013.01); *H04L 45/02* (2013.01)

(58) Field of Classification Search
None
See application file for complete search history.

(56) References Cited

U.S. PATENT DOCUMENTS

| | | | |
|---|---|---|---|
| 9,667,753 B2 | 5/2017 | Varble et al. | |
| 2008/0056300 A1 | 3/2008 | Williams | |
| 2009/0052346 A1 | 2/2009 | Brown et al. | |
| 2012/0127903 A1 | 5/2012 | Estevez et al. | |
| 2012/0230340 A1* | 9/2012 | Armstrong | H04L 69/08 370/392 |
| 2013/0148663 A1* | 6/2013 | Xiong | H04L 45/745 370/392 |
| 2014/0029623 A1 | 1/2014 | Hernandez et al. | |
| 2015/0358202 A1 | 12/2015 | Varble et al. | |

* cited by examiner

*Primary Examiner* — Edan Orgad
*Assistant Examiner* — Rebecca Song
(74) *Attorney, Agent, or Firm* — Haynes and Boone, LLP

(57) ABSTRACT

An Ethernet switch includes an Ethernet processing system. Layer two (L2) forwarding tables are provided with the Ethernet processing system, and a memory system is coupled to the Ethernet processing system and includes Ethernet processing system software. A control subsystem establishes communication with the Ethernet processing system and modifies the L2 forwarding tables by removing default Ethernet entries, adding Fibre Channel over Ethernet (FCoE) formatted FC well know addresses (WKAs), and setting the one or more L2 forwarding tables to remain persistent. The control subsystem also instructs the Ethernet processing system to forward FC control frames to the control subsystem, and replaces first link state instructions in the Ethernet processing system software with second link state instructions to change Ethernet behavior to FC behavior. The control subsystem may then process FC information in received FCoE format Ethernet frames.

20 Claims, 10 Drawing Sheets

US 9,935,874 B2

FIBRE CHANNEL GATEWAY SYSTEM

CROSS REFERENCE TO RELATED APPLICATIONS

The present application is a Continuation-in-part Application of U.S. Utility application Ser. No. 14/295,999, filed on Jun. 4, 2014, the disclosure of which is incorporated herein by reference.

BACKGROUND

The present disclosure relates generally to information handling systems (IHSs), and more particularly to Fibre Channel gateway system for providing a direct Fibre Channel connection to a Fibre Channel storage area network.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Some IHSs including, for example, server IHSs such as blade servers, may be housed in a chassis enclosure such as, for example, the PowerEdge M1000e blade enclosure available from Dell Inc. of Round Rock, Tex. In some situations, it is desirable to connect those server IHSs to Fibre Channel storage area networks (SANs). Conventionally, converged network adapters on the server IHSs that utilize Fibre Channel over Ethernet (FCoE) communications must be connected to the SAN fabric via proprietary converged Ethernet switches and, in some cases, FCoE transit switches as well, both options of which suffer from a number of drawbacks.

Conventional proprietary converged Ethernet switches typically include an Ethernet switch Application Specific Integrated Circuit (ASIC) connected to a Fibre Channel switch ASIC by a connectivity Field Programmable Gate Array (FPGA). The Ethernet switch ASIC and the Fibre Channel switch ASIC must each be provided their own operating systems and must be configured with separate, different, and distinct command line interfaces. The use of two ASICs and an FPGA, along with other features of conventional proprietary converged Ethernet switches, increases the complexity and the cost of connecting the server IHSs to the SAN. Conventional FCoE transit switches provide a FCoE initialization protocol (FIP) snooping bridge or Front Side Bus (FSB) that does not provide native Fibre Channel at the chassis enclosure, still requires a converged Ethernet switch (such as those discussed above) with a Fibre Channel Forwarder (FCF) on the uplink ports, and introduce another hop in the FCoE path such that the system is subject to problems including head of line blocking, nondeterministic paths, nondeterministic impact of PAUSE/PFC across the PAUSE domains, and a variety of other multi-hop FCoe problems known in the art.

Accordingly, it would be desirable to provide an improved Fibre Channel gateway system.

SUMMARY

An information handling system (IHS), comprising: a control processing system; and a control memory system including instructions that, when executed by the control processing system, cause the control processing system to: establish communication with an Ethernet processing system; modify the one or more L2 forwarding tables that are provided with the Ethernet processing system by removing default Ethernet entries, adding Fibre Channel over Ethernet (FCoE) formatted FC well know addresses (WKAs), and setting the one or more L2 forwarding tables to remain persistent; instruct the Ethernet processing system to forward FC control frames to the control processing system; replace first link state instructions in Ethernet processing system software that is provided with the Ethernet processing system with second link state instructions to Ethernet behavior to FC behavior; and process FC information in FCoE format Ethernet frames.

BRIEF DESCRIPTION OF THE DRAWINGS

FIG. 7*a* is a schematic view of the handling of the control plane and the data plane in the systems and methods of the present disclosure.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
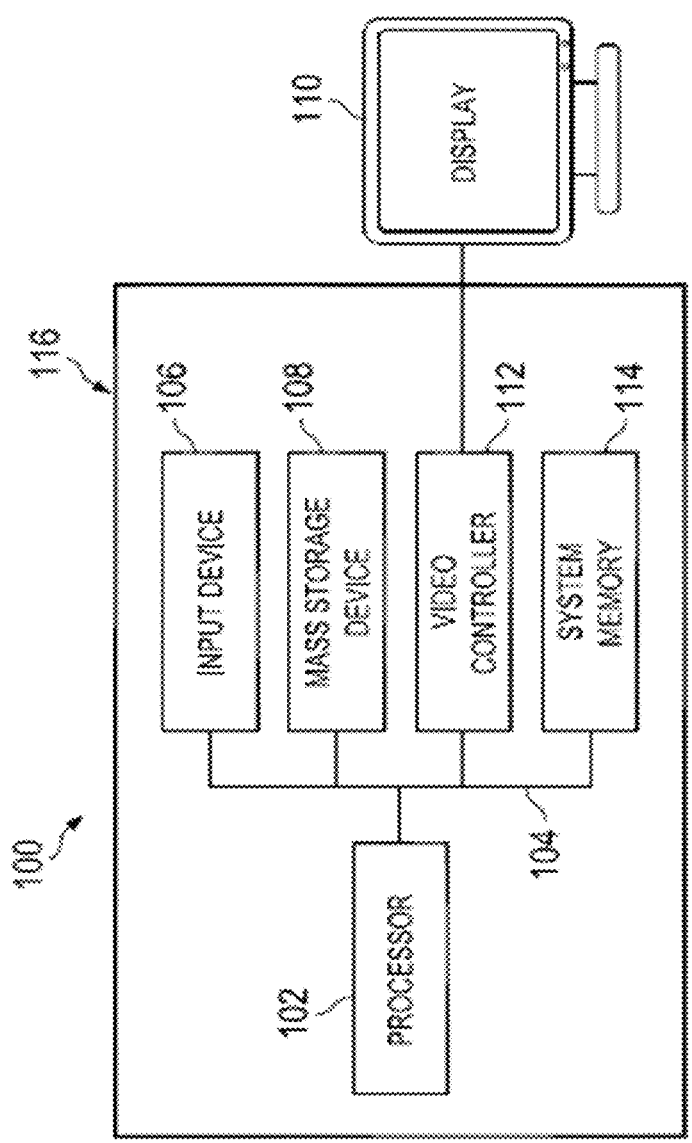
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
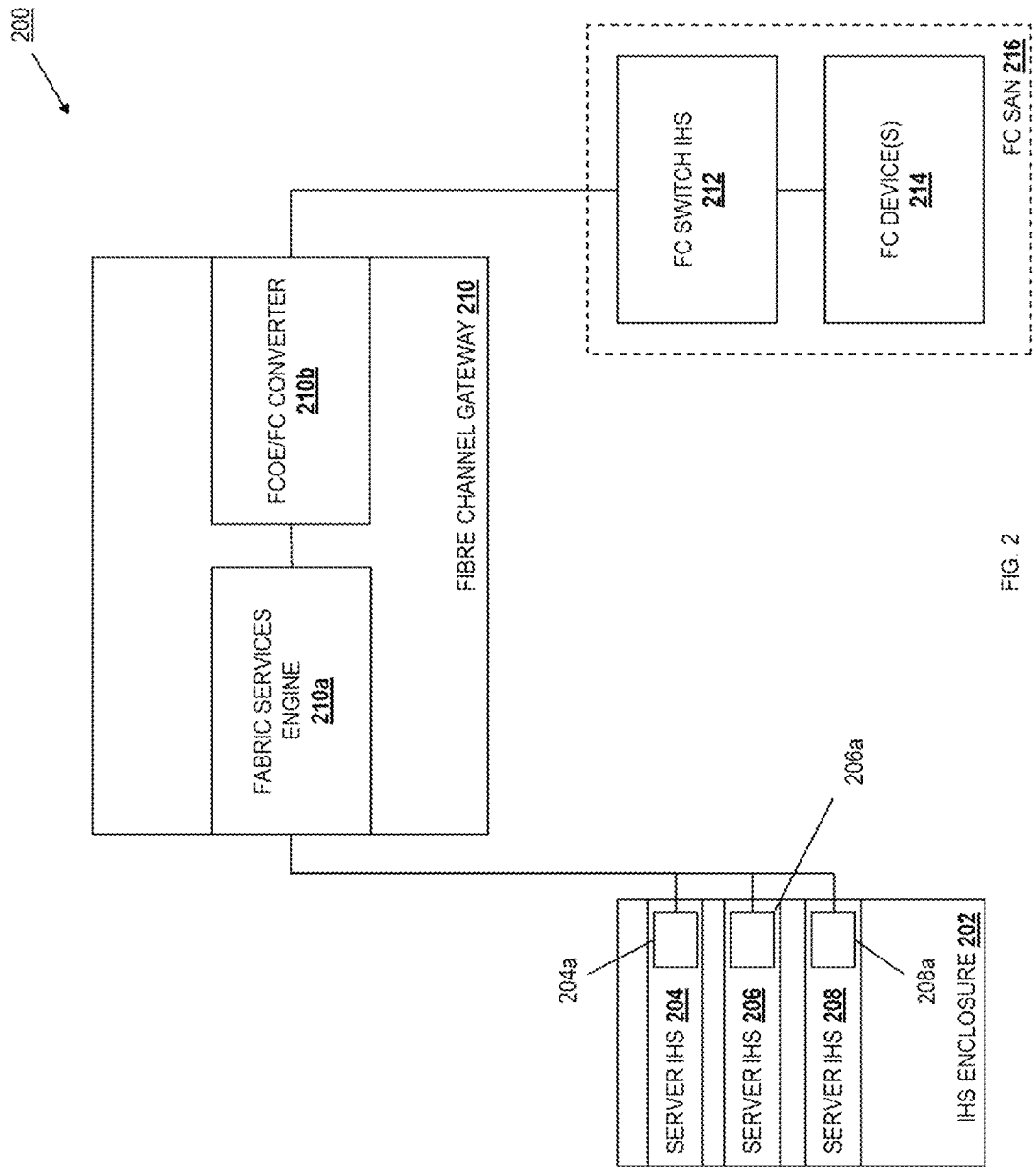
FIG. 2 is a schematic view illustrating an embodiment of a Fibre Channel Gateway System.

Referring now to FIG. 2, an embodiment of a Fibre Channel (FC) gateway system 200 is illustrated. The FC gateway system 200 includes an IHS enclosure 202 that houses a plurality of server IHSs 204, 206, and 208. In an embodiment, the IHS enclosure 202 may be a PowerEdge M1000e blade enclosure available from Dell Inc. of Round Rock, Tex., and the server IHSs 204, 206, and 208 may be blade servers. However, a wide variety of different types of IHS enclosures and IHS's are envisioned as falling within the scope of the present disclosure. In the illustrated embodiment, each of the server IHSs 204, 206, and 208 includes a respective converged network adapter 204a 206a, and 208a, that is directly connected to an FC gateway 210 that is further directly connected to an FC switch IHS 212 that is coupled to one or more FC devices 214. In an embodiment, the direct connection of the server IHSs 204, 208, and 208 to the FC gateway 210 may be provided by an Ethernet cable directly connected to Ethernet ports on the server IHSs 204, 206, and 208 and Ethernet ports on the FC gateway 210, an Ethernet connection through a backplane, and/or using a variety of other direct connection methods known in the art. While a direct connection between the server IHSs 204, 206, and 208 and the FC Gateway 210 operates to avoid a variety of Quality of Server (QoS) issues in the FC gateway system 200, in other embodiment, the server IHSs 204, 206, and 208 may be connected to the FC Gateway 210 by one or more other components such as, for example, a switch IHS. In an embodiment, the direct connection of the FC gateway 210 and the FC switch IHS 212 may be provided by an FC cable directly connected to FC ports on the FC gateway 210 and FC ports on the FC switch IHS 212, an FC connection through a backplane, and/or using a variety of other direct connection methods known in the art.

In an embodiment, the FC gateway 210 may be an Input/Output IHS that may include some or all of the components of the IHS 100 discussed above with reference to FIG. 1. While illustrated as separate from the IHS enclosure 202 for clarity of illustration and discussion, in some embodiments, the FC gateway 210 may be located in the IHS enclosure 202. In the illustrated embodiment, a memory system in the FC gateway 210 (e.g., the system memory 114 discussed above with reference to FIG. 1) may include instructions that, when executed by a processing system (e.g., the processor 102 discussed above with reference to FIG. 1), cause the processing system provide a fabric services engine 210a that is configured to perform any of the functionality of the fabric services engines discussed below. In some embodiments, the fabric services engine 210a may be referred to as an "essential" fabric services engine that provides for only the essential fabric services needed to enable the FC gateway 210, which may include, for example, the sending of fabric discovery request messages to the login server (e.g., using Well Known Address—0xFF:FF:FE), the sending of fabric login request messages to the login server (e.g., using Well Known Address—0XFF:FF:FE), etc. However, in other embodiments, the fabric services engine 210a may provide any of a variety of fabric services known in the art. In one example, the processing system that provides the fabric services engine 210a may be an Ethernet switch chip, although other processing systems are envisioned as falling within the scope of the present disclosure. The fabric services engine 210a may be directly connected to each of the server IHSs 204, 206, and 208 through, for example, a connection between the processing system that provides the fabric services engine 210a and the converged network adapters 204a 206a, and 208a in the server IHSs 204, 206, and 208, respectively.

In the illustrated embodiment, the FC gateway 210 also includes a Fibre Channel over Ethernet/Fibre Channel (FCoE/FC) converter 210b that is connected to the fabric services engine 210a, and that is directly connected to the FC switch IHS 212. In an embodiment, the FCoE/FC converter 210b may be provided on a physical layer (PHY) chip that is included on a plugin card that is removable from the FC gateway 210. However, in other embodiments, the FCoE/FC converter 210b may be integrated into the FC gateway 210 such that it not (easily) removable or replaceable. In one example, the FCoE/FC converter 210b may include an FCoE/FC encapsulator/decapsulator at the PHY level, and as discussed in detail below may operate with the fabric services engine 210a to provide a direct, native FC N_Port Identity (ID) Visualization (NPIV) gateway uplink to a storage area network (SAN) 216 provided by, for example, the FC switch IHS 212 and the one or more FC devices 214. As such, the FC gateway 210 may be referred to as an FC NPIV gateway in which multiple N_Port IDs share a single physical N_Port to allow multiple FC initiators to occupy a single physical port.

In an embodiment, the FC gateway 210 is programmed to handle FCoE Initialization Protocol (FIP) data traffic (also referred to below as FIP "messages"), FIP fabric login messages, FCoE data traffic between the server IHSs 204, 206, and 208 and the FC SAN 216, and protocol translation that provides for the direct FC SAN uplink once initialization is complete. For example, the processing system (e.g., an Ethernet switch chip) that provides the fabric services engine 210a may include (e.g., be programmed with) learning programming such as, for example, layer 2 learning programming that allows the fabric services engine 210a to learn destination addresses, provide for pre-population of MAC addresses that correspond to FC Well Known Addresses (WKAs), etc. Furthermore, the processing system (e.g., an Ethernet switch chip) that provides the fabric services engine 210a may also include (e.g., be programmed with) all FC WKAs. Further still, the processing system (e.g., an Ethernet switch chip) that provides the fabric services engine 210a may also be programmed to create and handle the FCoE "wrapped" FC fabric login messages and accept messages as discussed below. Further still, a spoofed FC Forwarding (FCF) Media Access Control (MAC) address may be programmed into the FCoE/FC converter 210b source address with an algorithmic replacement rule that provides for the creation of Ethernet MAC addresses from FC source and/or destination addresses (FCIDs) and an FC map. The creation of Ethernet MAC addresses from FC source and/or destination addresses and an FC map using the FCoE/FC converter 210b provides for Ethernet forwarding on a standard Ethernet switch chip ("merchant" silicon) as opposed to a proprietary FC switch chip. While a few examples of the programming of the FC gateway 210 have been provided, one of skill in the art will recognize that other functionality discussed below may be programmed into the FC gateway 210 while remaining within the scope of the present disclosure. One of skill in the art in possession of the present disclosure will recognize that the FC gateway 210 provides a simpler, less expensive solution that is easier to configure and use than conventional converged Ethernet switches (sometimes in combination with FCoE transit switches), and when included in the IHS enclosure 202 provides for a direct, native FC NPIV gateway uplink from the back of the IHS enclosure 202 to the FC SAN 216.

Figure 3:
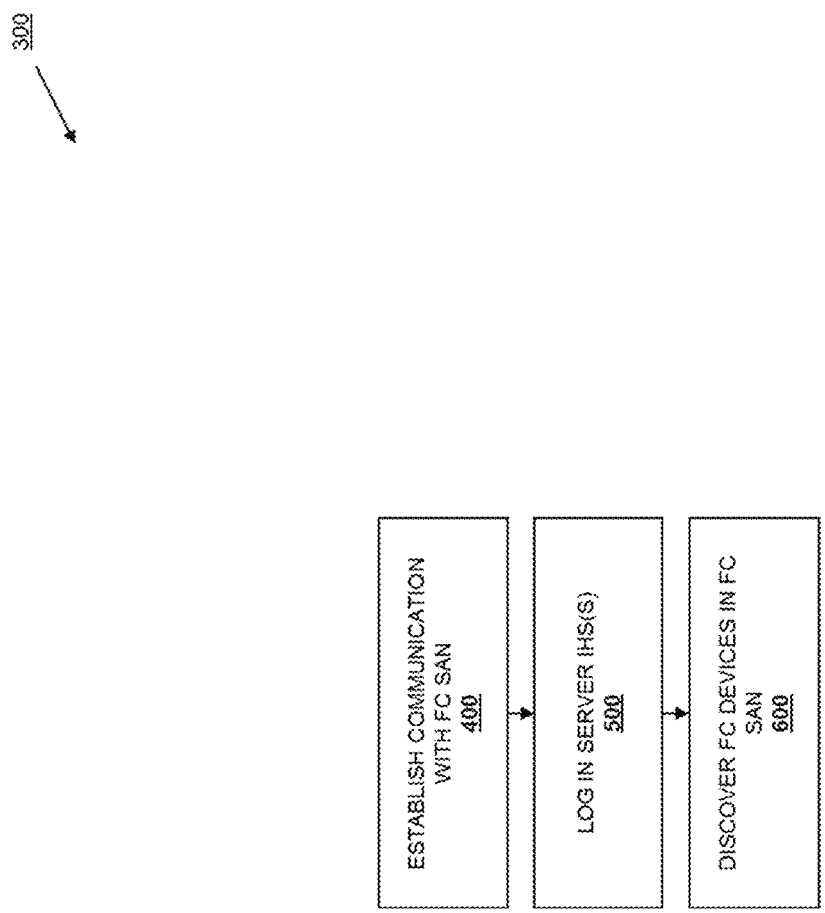
FIG. 3 is a flow chart illustrating an embodiment of a method for providing a Fibre Channel Gateway.

Referring now to FIG. 3, an embodiment of a method 300 for providing an FC gateway is illustrated that may be performed using the FC gateway system 200 discussed above with reference to FIG. 2. Each of the method blocks 400, 500, and 600 include several sub-blocks that are illustrated and described with reference to FIGS. 4, 5, and 6, respectively. However, generally, the method 300 begins at block 400 where communications are established with the FC SAN, followed by block 500 where each server IHS is logged in, and then followed by block 600 where fc devices in the FC SAN are discovered.

Figure 4:
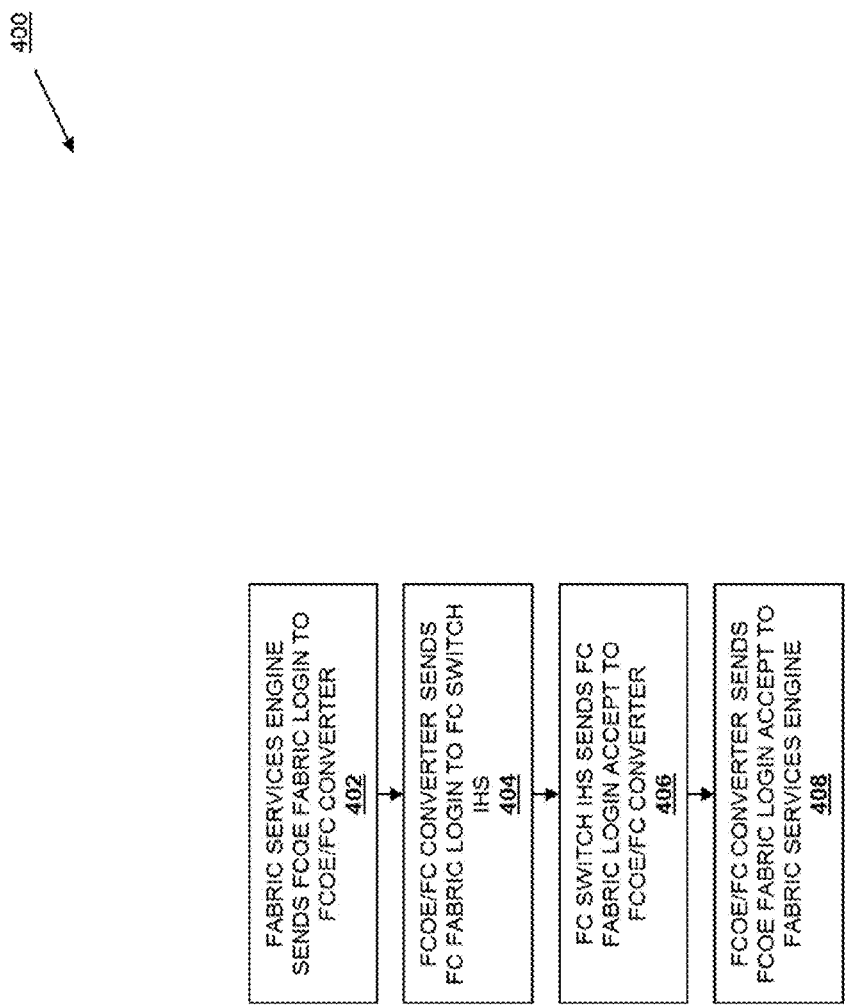
FIG. 4 is a flow chart illustrating an embodiment of a portion of the method for providing the Fibre Channel Gateway of FIG. 3.

Referring now to FIG. 4, an embodiment of block 400 of the method 300 in which communication is established with the FC SAN is illustrated. Block 400 begins with sub-block 402 where the fabric services engine sends an FCoE fabric login to the FCoE/FC converter. In an embodiment, the method 300 and/or method block 400 may begin upon connection, power up, or other initialization of the fabric gateway system 200, and following each upstream FC port on the FC gateway 210 completing initialization with the FC SAN 216 and informing the fabric services engine 210a that initialization is complete. In an embodiment of sub-block 402, the fabric services engine 210a sends an FCoE fabric login message (e.g., an FCoE FLOGI) to the FCoE/FC converter 210b for each FC port on the FC gateway 210. In an embodiment, the FCoE fabric login message sent at sub-block 402 includes a convention FC fabric login message wrapped in an FCoE header and trailer. In an embodiment, the fabric services engine 210a may use a spoofed FCF MAC address (which may have been previously programmed into the source address of the FCoE/FC converter 210b as discussed above) as its source address when communicating with the FCoE/FC converter 210b at sub-block 402 and other blocks and sub-blocks of the method 300 (e.g., a source MAC address F0:4D:A2:00:DE:XX, where XX designates a respective FC port on the FC gateway 210). For example, the fabric services engine 210a may use a source MAC address F0:4D:A2:00:DE:01 for a first FCoE fabric login message provided for a first FC port on the FC gateway 210, a source MAC address F0:4D:A2:00:DE:02 for a second FCoE fabric login message provided for a second FC port on the FC gateway 210, and so on. In an example, the FCoE fabric login message may also include a destination MAC address (e.g., 0E:FC:00:FF:FF:FE that may include an FCoE Mapped Address Prefix (FCMAP) and a Login Server WKA that is programmed into the fabric services engine 210a), a System Identification (SID) (e.g., 00:00:00, an unassigned FC identification), and a Destination Identification (DID) (e.g., FF:FF:FE, the Login Server WKA).

Block 400 then proceeds to sub-block 404 where the FCoE/FC converter sends an FC fabric login to the FC switch IHS. In an embodiment, the FCoE/FC converter 210b receives the FCoE fabric login message from the fabric services engine 210a and converts it to an FC fabric login message (e.g., an FC FLOGI) that is sent to the FC switch IHS 212. In an embodiment, the FCoE/FC converter 210b converts the FCoE fabric login message to an FC fabric login message by stripping the FCoE header and trailer from the FCoE fabric login message. In an example, the FC fabric login message may include the SID (e.g., 00:00:00, an unassigned FC identification), and the DID (e.g., FF:FF:FE, the Login Server WKA).

Block 400 then proceeds to sub-block 406 where the FC Switch IHS sends an FC fabric login accept to the FCoE converter 210b. In an embodiment, the FC switch IHS 212 receives the FC fabric login message from the FCoE/FC converter 210b and, if that FC fabric login message is accepted, replies with an FC fabric login accept message (e.g., an FC FLOGI ACC) that is sent to the FCoE converter 210b. FC switch IHS actions to determine whether an FC fabric login message is accepted are known in the art and are not discussed in further detail here. In an example, the FC fabric login accept may include an SID (e.g., FF:FF:FE, the Login Server WKA), and a DID (e.g., 03:01:01, an assigned FC identification).

Block 400 then proceeds to sub-block 408 where the FCoE/FC converter sends an FCoE fabric login accept to the fabric services engine. In an embodiment, the FCoE/FC converter 210b receives the FC fabric login accept message from the FC switch IHS 212 and converts it to an FCoE fabric login accept message (e.g., an FCoE FLOGI ACC) that is sent to the fabric services engine 210a. In an embodiment, the FCoE/FC converter 210b converts the FC fabric login accept message to an FCoE fabric login accept message by wrapping the FC fabric login accept message in an FCoE header and trailer. In an example, the FCoE fabric login accept message may include a source MAC address (e.g., F0:4D:A2:00:DE:XX, the spoofed FCF MAC address used by the fabric services engine 210a, discussed above) that is added to the FCoE fabric login accept message by the algorithmic replacement in the FCoE/FC converter 210b, as discussed above. In an example, the FCoE fabric login accept message may also include a destination MAC address (e.g., 0E:FC:00:03:01:01, which may include a Fabric Provided MAC Address (FPMA), an FCMAP, and a DID FC identification) which may be added to the FCoE fabric login accept message by algorithmic replacement in the FCoE/FC converter 210b, as discussed above. In an example, the FCoE fabric login accept message may also include a SID (e.g., FF:FF:FE, the Login Server WKA) and a DID (e.g., 03:01:01, an assigned FC identification). In an embodiment, the FCoE fabric login accept message is trapped by hardware in the FC gateway 210 and sent the fabric services engine 210a at sub-block 408.

Following sub-block 408 of block 400 of the method 300, the FC gateway 210 has established communication with the FC SAN 216 (e.g., through the communications discussed above with the FC switch IHS 212) and each of the upstream FC ports on the FC gateway 210 has logged in to the FC SAN 216. The method 300 may then proceed to block 500 where the server IHS(s) 204, 206, and 208 are logged in through their associated converged network adapters 204a, 206a, and 208a.

Figure 5:
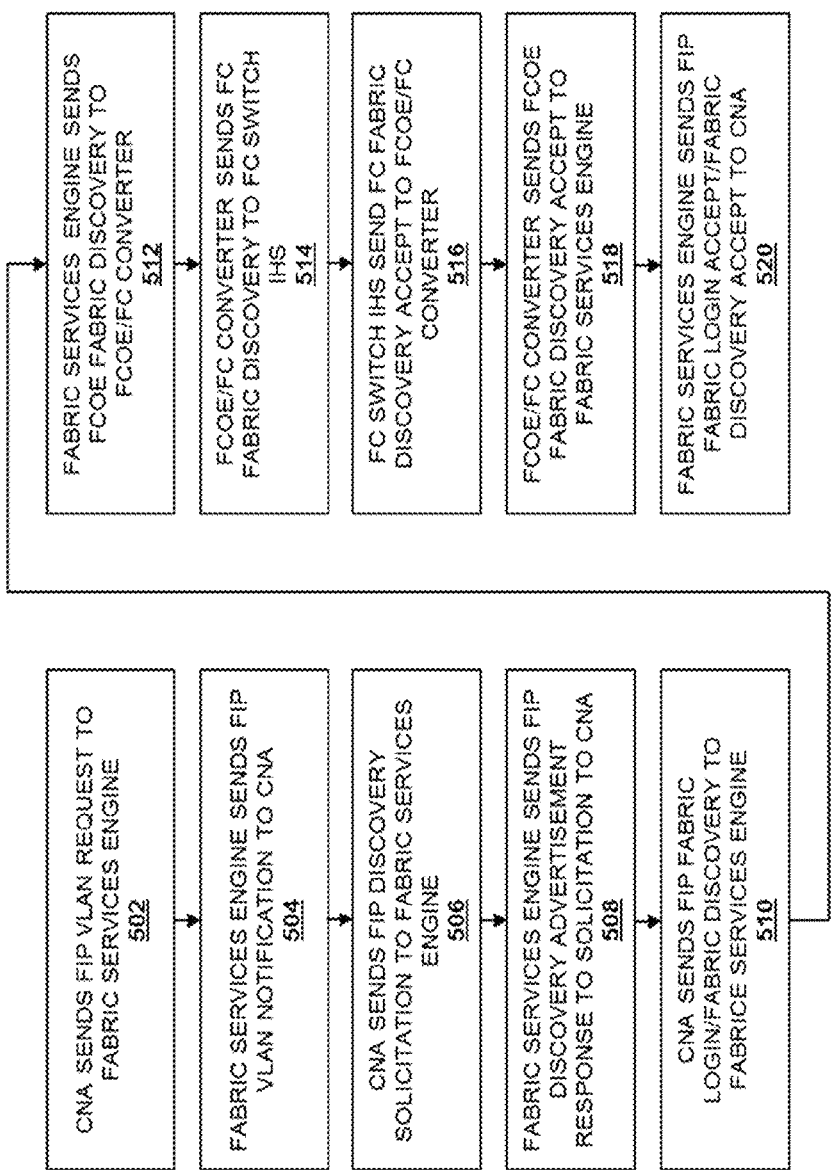
FIG. 5 is a flow chart illustrating an embodiment of a portion of the method for providing the Fibre Channel Gateway of FIG. 3.

Referring now to FIG. 5, an embodiment of block 500 of the method 300 in which server IHS(s) are logged in is illustrated. One of skill in the art in possession of the present disclosure will recognize that block 500 allows the server IHS(s) 204, 206, and 208 to log into the FC switch IHS 212, but will operate such that the server IHS(s) 204, 206, and 208 "believe" they are logging into a conventional FCF. Block 500 begins with sub-block 502 where a converged network adapter (CNA) sends an FIP Virtual Local Area Network (VLAN) request to the fabric services engine. Using the server IHS 204 and its associated CAN 204a as an example, in an embodiment, the CNA 204a sends an FIP VLAN request message to the fabric services engine 210a. In an example, the FIP VLAN request message may include a source MAC address (e.g., 00:01:02:03:04:05, A CNA ENode MAC address) and a destination MAC address (e.g., 01:10:18:01:00:02, an all-FCF-MAC-addresses address). In an embodiment, the FIP VLAN request message sent by the CNA 204a may be directed (or redirected) to the fabric services engine 210a based on its FIP Ethertype.

Block 500 then proceeds to sub-block 504 where the fabric services engine sends an FIP VLAN notification to the CNA. In an embodiment, the fabric services engine 210a receives the FIP VLAN request message from the CNA 204a and, in response, sends an FIP VLAN notification message to the CNA 204a as is known in the art of FCoE FIP systems. In an embodiment, the fabric services engine 210a may use a spoofed FCF MAC address that previously programmed into the source address of the FCoE/FC converter 210b as its source address when communicating with the CNAs at sub-block 504 and other blocks and sub-blocks of the method 300 (e.g., a source MAC address F0:4D:A2:00:DE:XX, where XX designates the FC port on the FC gateway 210). For example, the fabric services engine 210a may use the source MAC address F0:4D:A2:00:DE:01 for a first FIP VLAN notification message provided for a first FC port on the FC gateway 210, the source MAC address F0:4D:A2:00:DE:02 for a second FIP VLAN notification message provided for a second FC port on the FC gateway 210, and so on. In an example, the FIP VLAN notification message may include a destination MAC address (e.g., 00:01:02:03:04:05, the CNA ENode MAC address).

Block 500 then proceeds to sub-block 506 where the CNA sends an FIP discovery solicitation to the fabric services engine. In an embodiment, the CNA 204a sends an FIP discovery solicitation message to the fabric services engine 210a in response to receiving the FIP VLAN notification message at block 604. In an example, the FIP discovery solicitation message may include a source MAC address (e.g., 00:01:02:03:04:05, the CNA ENode MAC address) and a destination MAC address (e.g., 01:10:18:01:00:02, an all-FCF-MAC-addresses address). In an embodiment, the FIP discovery solicitation message sent by the CNA 204a may be directed (or redirected) to the fabric services engine 210a based on its FIP Ethertype.

Block 500 then proceeds to sub-block 508 where the fabric services engine sends an FIP discovery advertisement response to solicitation to the CNA. In an embodiment, the fabric services engine 210a receives the FIP discovery solicitation message from the CNA 204a and, in response, sends an FIP discovery advertisement response to solicitation message to the CNA 204a as is known in the art of FCoE FIP systems. In an embodiment, the fabric services engine 210a may use the spoofed FCF MAC address (e.g., F0:4D:A2:00:DE:XX, discussed above) as the source address for the FIP discovery response to solicitation message, and a destination MAC address (e.g., 00:01:02:03:04:05, the CNA ENode MAC address).

Block 500 then proceeds to sub-block 510 where the CNA sends one of an FIP fabric login or an FIP fabric discovery (e.g., an FIP FDISC) to the fabric services engine in response to receiving the FIP discovery advertisement response to solicitation. In an embodiment, the CNA 204a may send one of an FIP fabric login message or an FIP fabric discovery message to the fabric services engine 210a depending on whether the communication is the first login communication by the server IHS to the fabric services engine 210a (in which case a FIP fabric login message is sent) or the communication is any subsequent login communication by the server IHS to the fabric service engine 210a (in which case a FIP fabric discovery message is sent). In an example, the FIP fabric login message/FIP fabric discovery message may include a source MAC address (e.g., 00:01:02:03:04:05, the CNA ENode MAC address) and a destination MAC address that is the spoofed FCF MAC address provided by the fabric services engine 210a (e.g., F0:4D:A2:00:DE:XX, discussed above). In an embodiment, the FIP fabric login message/FIP fabric discovery message sent by the CNA 204a may be directed (or redirected) to the fabric services engine 210a based on its FIP Ethertype.

Block 500 then proceeds to sub-block 512 where the fabric services engine sends an FCoE fabric discovery to the FCoE/FC converter. In an embodiment, the fabric services engine 210a receives the FIP fabric login message/FIP fabric discovery message from the CNA 204a and, in response, sends an FCoE fabric discovery message to the FCoE/FC converter 210b. In an embodiment, the fabric services engine 210a converts the FIP fabric login message/FIP fabric discovery message into an FCoE fabric discovery message by, for example, copying the FC frame payload from the FIP fabric login message/FIP fabric discovery message, converting the extended link service command code to fabric discovery if it is provided in a fabric login format, regenerating a FC cyclic redundancy check (CRC) or checksum, and wrapping the resulting package in an FCoE header and trailer. In an example, the FCoE fabric discovery message includes a source MAC address (e.g., 00:01:02:03:04:05, the CNA ENode MAC address) and a destination MAC address (e.g., 0E:FC:00:FF:FF:FE, which may include an FCoE "wrapped" login server WKA).

Block 500 then proceeds to sub-block 514 where the FCoE/FC converter sends an FC fabric discovery to the FC switch IHS. In an embodiment, the FCoE/FC converter 210b receives the FCoE fabric discovery message from the fabric services engine 210a and, in response, converts the FCoE fabric discovery message to an FC fabric discovery message that is then sent to the FC switch IHS 212. In an embodiment, the FCoE converter 210b converts the FCoE fabric discovery message to an FC fabric discovery message by stripping the FCoE header and trailer from the FCoE fabric discovery message. In an example, the FCoE fabric discovery message includes a SID (e.g., 00:00:00, an unassigned FC identification), and a DID (e.g., FF:FF:FE, the Login Server WKA).

Block 500 then proceeds to sub-block 516 where the FC Switch IHS sends an FC fabric discovery accept to the FCoE converter. In an embodiment, the FC switch IHS 212 receives the FC fabric discovery message from the FCoE/FC converter 210*b* and, if the FC fabric discovery message is valid, replies with an FC fabric discovery accept message (e.g., an FC FDISC ACC) that is sent to the FCoE converter 210*b*. FC switch IHS actions to determine whether an FC fabric discovery message is valid are known in the art and are not discussed in further detail here. In an example, the FC fabric discovery accept message may include the SID (e.g., FF:FF:FE, the Login Server WKA), and a DID (e.g., 03:01:01, the assigned FC identification for the CNA).

Block 500 then proceeds to sub-block 518 where the FCoE/FC converter sends an FCoE fabric discovery accept to the fabric services engine. In an embodiment, the FCoE/FC converter 210*b* receives the FC fabric discovery accept message from the FC switch IHS 212 and converts it to an FCoE fabric discovery accept message (e.g., an FCoE FDISC ACC) that is sent to the fabric services engine 210*a*. In an embodiment, the FCoE/FC converter 210*b* converts the FC fabric discovery accept message into an FCoE fabric discovery accept message by, for example, copying the FC frame payload from the FC fabric discovery accept message, and wrapping the FC frame payload in an FCoE header and trailer. In an example, the FCoE fabric discovery accept message may include the spoofed FCF MAC address used by the fabric services engine 210*a* (e.g., F0:4D:A2:00:DE:XX, discussed above) and a destination MAC address (e.g., 0E:FC:00:03:01:01, which may includes the CNA FPMA and a VN_Port MAC address) that are added by algorithmic replacement in the FCoE/FC converter 210*b*, as discussed above. In an embodiment, the FCoE fabric login accept message is trapped by hardware in the FC gateway 210 and sent the fabric services engine 210*a*.

Block 500 then proceeds to sub-block 520 where the fabric services engine sends one of an FIP fabric login accept or FIP fabric discovery accept to the CNA. In an embodiment, the fabric services engine 210*a* receives the FCoE fabric discovery accept message from the FCoE/FC converter 210*b* and, in response, may send one of an FIP fabric login accept message or an FIP fabric discovery accept message to the CNA 204*a* depending on whether a FIP fabric login message was received at block 510 (in which case a FIP fabric login accept message is sent) or a FIP fabric discovery message was received at block 510 (in which case a FIP fabric discovery accept message is sent. In an embodiment, the fabric services engine 210*a* converts the FCoE fabric discovery accept message into an FIP fabric login accept message/FIP fabric discovery accept message by, for example, copying the FC frame payload from the FCoE fabric discovery accept message, converting the extended link service command code to fabric login if it is provided in a fabric discovery format, regenerating a FC CRC or checksum, and wrapping the resulting package in an FCoE header and trailer. In an example, the FIP fabric login accept message/FIP fabric discovery accept message may include the spoofed FCF MAC address (e.g., F0:4D:A2:00:DE:XX, discussed above) as the source MAC address for the FIP fabric login accept message/FIP fabric discovery accept message and a destination MAC address (e.g., 00:01:02:03: 04:05, the CNA ENode MAC address).

Block 500 of the method 300 may be performed for each server IHS 204, 206, and 208 by communicating with its respective CNA similarly as discussed above for the CNA 204*a* of the server IHS 204. Following sub-block 520 of block 500 of the method 300, each of the server IHSs are logged in through their associated converged network adapters 204*a* 206*a*, and 208*a*, and the method 500 may proceed to block 600 where FC devices in the SAN are discovered. Furthermore, following block 520, the FCoE/FC converter 210*b* is programmed to convert FCoE communications from the server IHSs 204, 206, and 208 to FC communications provided to the FC SAN 216, and vice versa, e.g., using on the algorithmic replacement discussed above. In an embodiment, the FC devices are storage devices.

Figure 6:
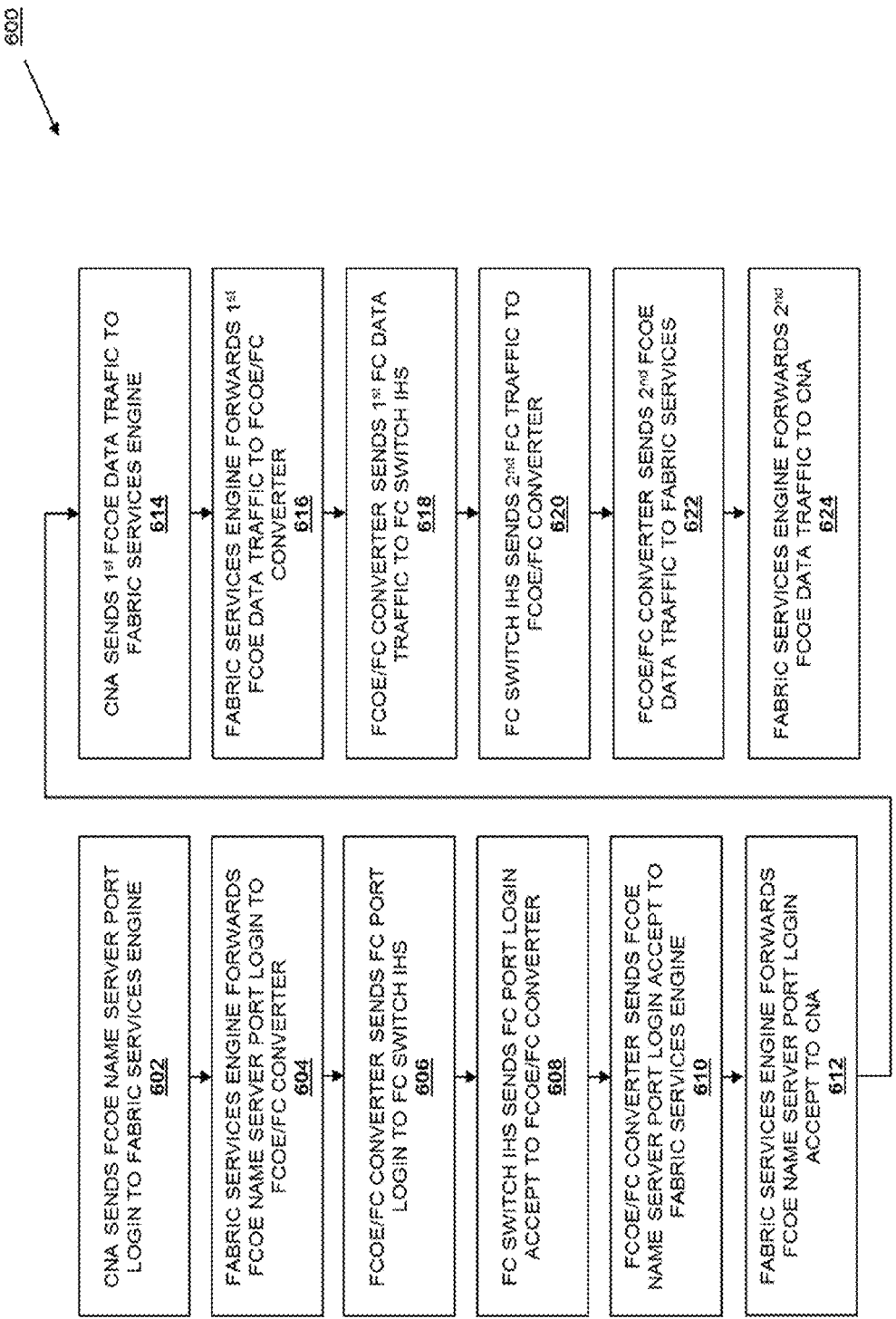
FIG. 6 is a flow chart illustrating an embodiment of a portion of the method for providing the Fibre Channel Gateway of FIG. 3.

Referring now to FIG. 6, an embodiment of block 600 of the method 300 in which FC devices in the SAN are discovered is illustrated. Block 600 begins with sub-block 602 where a CNA sends an FCoE name server port login to the fabric services engine. Using the server IHS 204 and its associated CNA 204*a* as an example, in an embodiment, the CNA 204*a* sends an FCoE name server port login message (e.g., an FCoE NS PLOGI) to the fabric services engine 210*a* in response to, for example, receiving the FIP fabric login accept message/FIP fabric discovery accept message. In an example, the FCoE name server port login message includes a source MAC address (e.g., 0E:FC:00:03:01:01, which may include the CNA FPMA and a VN_Port MAC address) and a destination MAC address that is the spoofed FCF MAC address used by the fabric services engine 210*a* (e.g., F0:4D:A2:00:DE:XX, discussed above).

Block 600 then proceeds to sub-block 604 where the fabric services engine forwards the FCoE name server port login to the FCoE/FC converter. In an embodiment, the fabric services engine 210*a* receives the FCoE name server port login message from the CNA 204*a* and, in response, forwards the FCoE name server port login message directly to the FCoE/FC converter 210*b*. Block 600 then proceeds to sub-block 606 where the FCoE/FC converter sends an FC port login to the FC switch IHS. In an embodiment, the FCoE/FC converter 210*b* receives the forwarded FCoE name server port login message from the fabric services engine 210*a* and, in response, converts the FCoE name server port login message to an FC port login message that is sent to the FC switch IHS 212 based on the programming of the FCoE/FC converter 210*b* as discussed above with reference to block 500. In an example, the FC port login message includes an SID (e.g., 03:01:01, the assigned FC identification for the CNA), and a DID (e.g. FF:FF:FE, the Name Server WKA).

Block 600 then proceeds to sub-block 608 where the FC switch IHS sends an FC port login accept to the FCoE converter 210*b*. In an embodiment, the FC switch IHS 212 receives the FC port login message from the FCoE/FC converter 210*b* and, if the FC port login message is accepted, replies with an FC port login accept (e.g., an FC PLOGI ACC) that is sent to the FCoE converter 210*b*. In an example, the FC port login accept may include the SID (e.g., FF:FF:FE, the Name Server WKA), and a DID (e.g., 03:01: 01, the assigned FC identification for the CNA).

Block 600 then proceeds to sub-block 610 where the FCoE/FC converter sends an FCoE name server port login accept to the fabric services engine. In an embodiment, the FCoE/FC converter 210*b* receives the FC port login accept message from the FC switch IHS 212 and, in response, converts the FC port login accept message based on the programming of the FCoE/FC converter 210*b* as discussed above with reference to block 500 to an FCoE name server port login accept message that is sent to the fabric services engine 210*a*. In an example, the FCoE name server port login accept message uses the spoofed FCF MAC address (e.g., F0:4D:A2:00:DE:XX, discussed above) as the source address and a destination address (e.g., 0E:FC:00:03:01:01, which may includes the CNA FPMA and a VN_Port MAC address) that are added by algorithmic replacement in the FCoE/FC converter 210b, as discussed above.

Block 600 then proceeds to sub-block 612 where the fabric services engine forwards the FCoE name server port login accept to the CNA. In an embodiment, the fabric services engine 210a receives the FCoE name server port login accept message from the FCoE/FC converter 201a and, in response, forwards the FCoE name server port login accept message directly to the CNA 204a. Following the forwarding of the FCoE name server port login accept message to the CNA 204a one of skill in the art in possession of the present disclosure will recognize that other fabric services commands not explicitly discussed herein may be sent between the CNa 204a and the FC SAN 216 through the FCoE/FC converter 210b while remaining within the scope of the present disclosure.

Block 600 then proceeds to sub-block 614 where the CNA sends first FCoE data traffic to the fabric services engine. In an embodiment, the CNA 204a sends first FCoE data traffic to the fabric services engine 210a. In an example, the first FCoE data traffic includes a source address (e.g., 0E:FC:00: 03:01:01, which may include the CNA FPMA and a VN_Port MAC address) and a destination address that is the spoofed FCF MAC address used by the fabric services engine 210a (e.g., F0:4D:A2:00:DE:XX, discussed above).

Block 600 then proceeds to sub-block 616 where the fabric services engine forwards the first FCoE data traffic to the FCoE/FC converter. In an embodiment, the fabric services engine 210a receives the first FCoE data traffic from the CNA 204a and, in response, forwards the first FCoE data traffic directly to the FCoE/FC converter 210b. Block 600 then proceeds to sub-block 618 where the FCoE/FC converter sends first FC data traffic to the FC switch IHS. In an embodiment, the FCoE/FC converter 210b receives the first FCoE data traffic from the fabric services engine 210a and, in response, converts the first FCoE data traffic to first FC data traffic based on the programming of the FCoE/FC converter 210b as discussed above with reference to block 500, and that first FC data traffic is sent to the FC switch IHS 212. In an example, the first FC data traffic includes an SID (e.g., 03:01:01, the assigned FC identification for the CNA), and a DID (e.g. 03:00:00, the FC identification of a target (e.g., an FC device 214 coupled to the FC switch IHS 212)).

Block 600 then proceeds to sub-block 618 where the FC switch IHS sends second FC data traffic to the FCoE converter 210b. In an embodiment, the FC switch IHS 212 receives the first FC data traffic from the FCoE/FC converter 210b, forwards that first FC data traffic to the destination FC device 214 E.g., based on the DID in the first FC data traffic), and then receives second FC data traffic from that FC device 214 that is sent to the FCoE converter 210b. In an example, the second FC data traffic may include an SID (e.g., 03:00: 00, the assigned FC identification for the CNA), and a DID (e.g. 03:01:01, the FC identification of a target).

Block 600 then proceeds to sub-block 620 where the FCoE/FC converter sends second FCoE data traffic to the fabric services engine. In an embodiment, the FCoE/FC converter 210b receives the second FC data traffic from the FC switch IHS 212 and, in response, converts the second FC data traffic to second FCoE data traffic based on the programming of the FCoE/FC converter 210b as discussed above with reference to block 500, and that second FCoE data traffic is sent to the fabric services engine 210a. In an embodiment, the second FCoE data traffic includes the spoofed FCF MAC address used by the fabric services engine 210a (e.g., F0:4D:A2:00:DE:XX, discussed above) as the source MAC address and a destination MAC address (e.g., 0E:FC:00:03:01:01, which may include includes the CNA FPMA and a VN_Port MAC address) that are added by algorithmic replacement in the FCoE/FC converter 210b, as discussed above.

Block 600 then proceeds to sub-block 624 where the fabric services engine forwards the second FCoE data traffic to the CNA. In an embodiment, the fabric services engine 210a receives the second FCoE data traffic from the FCoE/ FC converter 201a and, in response, forwards the second FCoE data traffic directly to the CNA 204a.

Figure 7A:
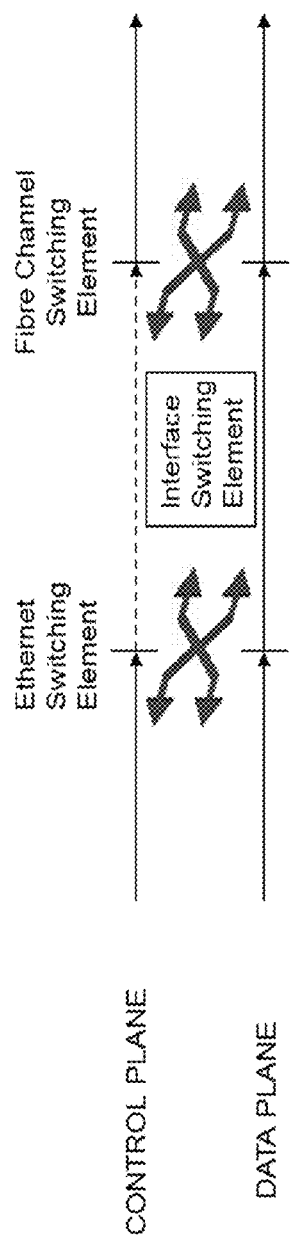
FIG. 7*a* is a schematic view of the handling of the control plane and the data plane in prior art systems and methods.
Figure 7B:
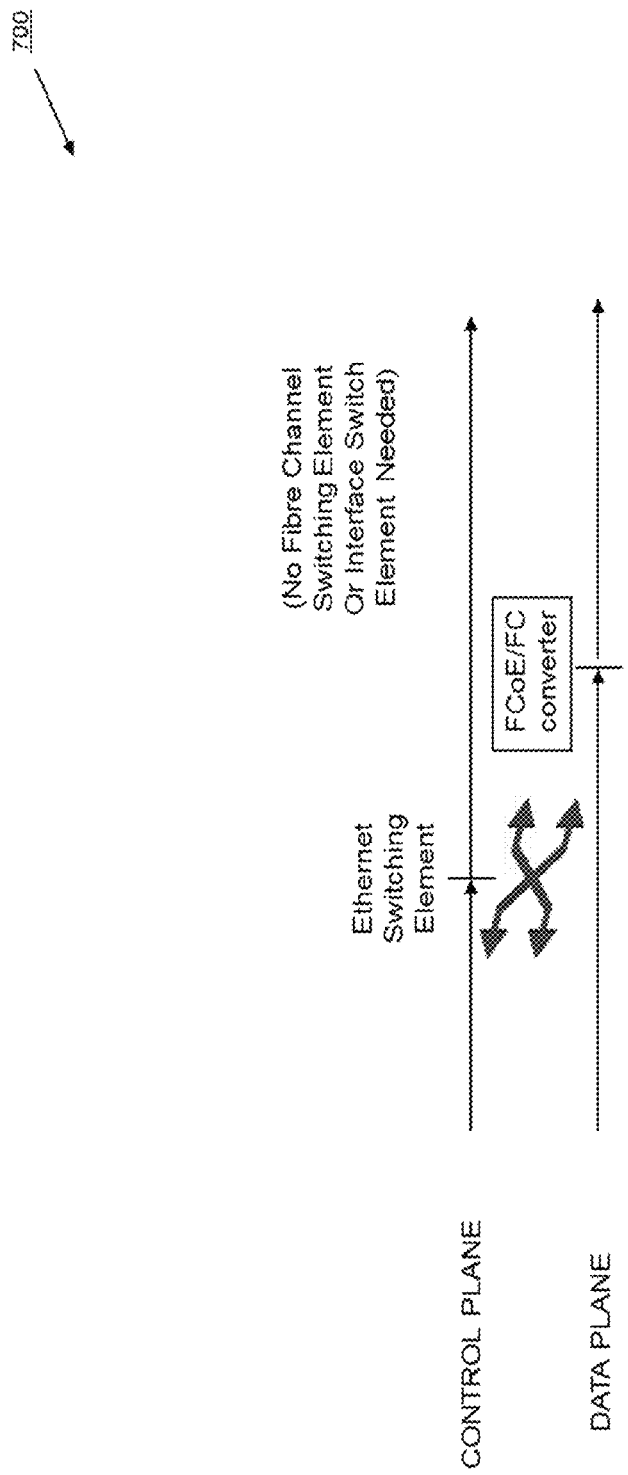

One of skill in the art will appreciate how blocks 400 and 500 of the method 300 provide for the processing of the control plane, while block 600 of the method 300 provides for the processing of the data plane. Referring to FIGS. 7a and 7b, the some differences between prior art methods for connecting server IHSs that use FCoE communications to SAN's that use FC communications and the systems and methods of the present disclosure are illustrated. FIG. 7a illustrates how, in prior art methods, the control plane and the data plane go through the same converged switch and FCF. FIG. 7b illustrates how, in the systems and methods of the present disclosure, the control plane is utilized to program an FCoE/FC converter to perform conversions such that a relatively simpler, faster, and cheaper switch chip (i.e., compared to the conventional systems discussed above) may be utilized for data processing on the data plane.

Thus, systems and methods have been described that provide a less complex and less expensive FC gateway that is configured to establish communication with an FC SAN, provide for the logging in of one or more server IHSs, and discover FC devices in the SAN so that the server IHSs may communicate with those FC devices. In some embodiments, the FC gateway provides an FC NPIV gateway in which all FIP traffic (e.g., VLAN request/notification, discovery solicitation/advertisement, FIP fabric login/fabric discovery, accepts, etc.) from server IHSs communicating using FCoE is handled by a fabric services engine that operates on the FC gateway and that also handles, for example, FIP FCoE link maintenance (e.g., FKA, discovery adjustment, CVL, FIP LOGO, etc.) In an embodiment, all FCoE communications may be passed through the FC NPIV gateway and have their FCoE headers stripped off on the way to the FCoE/FC encapsulator/decapsulator (i.e., converter) such that native FC communications are sent on to an upstream NPIV port on the FC SAN fabric. All incoming FC communications may be wrapped in an FCoE header by the fabric services engine and handled by a processing system (e.g., an Ethernet switch chip). In an embodiment, all FC fabric services (e.g., name server, management server, zoning, etc.) may be handled in the native FC SAN upstream from the FC gateway.

Figure 8:
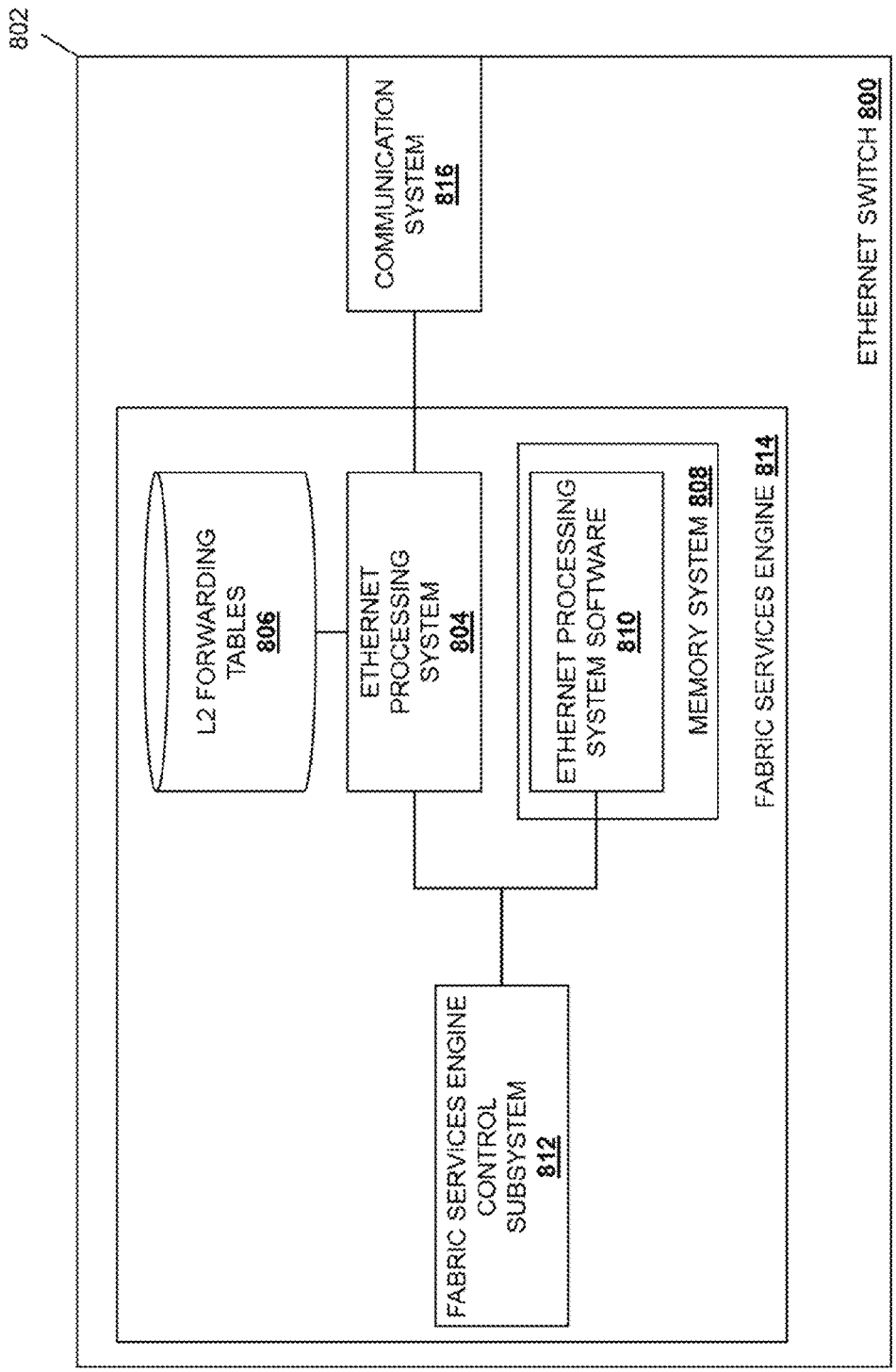
FIG. 8 is a schematic view illustrating an embodiment of an Ethernet switch including fabric services engine.

Referring now to FIG. 8, an embodiment of an Ethernet switch 800 is illustrated. In an embodiment, the Ethernet switch 800 may be provided as the Fibre Channel Gateway 210 discussed above. As such, the Ethernet switch 800 may be the IHS 100 discussed above with reference to FIG. 1, and/or may include some or all of the components of the IHS 100. The Ethernet switch 800 includes a chassis 802 that houses the components of the Ethernet switch 800, only some of which are illustrated in FIG. 8. In the illustrated embodiment, the chassis 802 houses an Ethernet processing system 804. For example, the Ethernet processing system 804 may be the Ethernet ASIC/switch chip discussed above (e.g., the standard Ethernet switch chip/"merchant" silicon discussed above). One or more layer 2 (L2) forwarding tables 806 are provided with, coupled to, or otherwise associated with the Ethernet processing engine 804. The chassis 802 also houses a memory system 808 that is coupled to the Ethernet processing system 804 and that may include one or more memory devices known in the art. In the illustrated embodiment, Ethernet processing system software 810 is provided on the memory system 808. For example, the Ethernet processing system software 810 may be software provided by a vendor of the Ethernet switch 800 that allows the Ethernet switch to perform conventional processing of Ethernet frames. The chassis 802 may also house a central processing unit (CPU) (not illustrated, but which may include the processor 102 discussed above with reference to FIG. 1) that is configured to provide a fabric services engine control subsystem 812 that is coupled to the Ethernet processing system 804 and the memory system 808 and that performs the operations of the control subsystems discussed below. In the illustrated embodiment, the Ethernet processing system 804, the L2 forwarding tables 806, the memory system 808 with the Ethernet processing system software 810, and the fabric services engine control subsystem 812 provide a fabric services engine 814 that may be the fabric services engine 210 discussed above. A communication system 816 may be provided in the chassis 802, coupled to the fabric services engine 814 (e.g., via a coupling to the Ethernet processing system 804), and configured to receive FCoE format Ethernet frames and transmit those FCoE format Ethernet frames to the fabric services engine 814 as discussed below. For example, the communication system 816 may include an Ethernet ingress queue and/or other Ethernet communications systems and subsystems known in the art.

Figure 9:
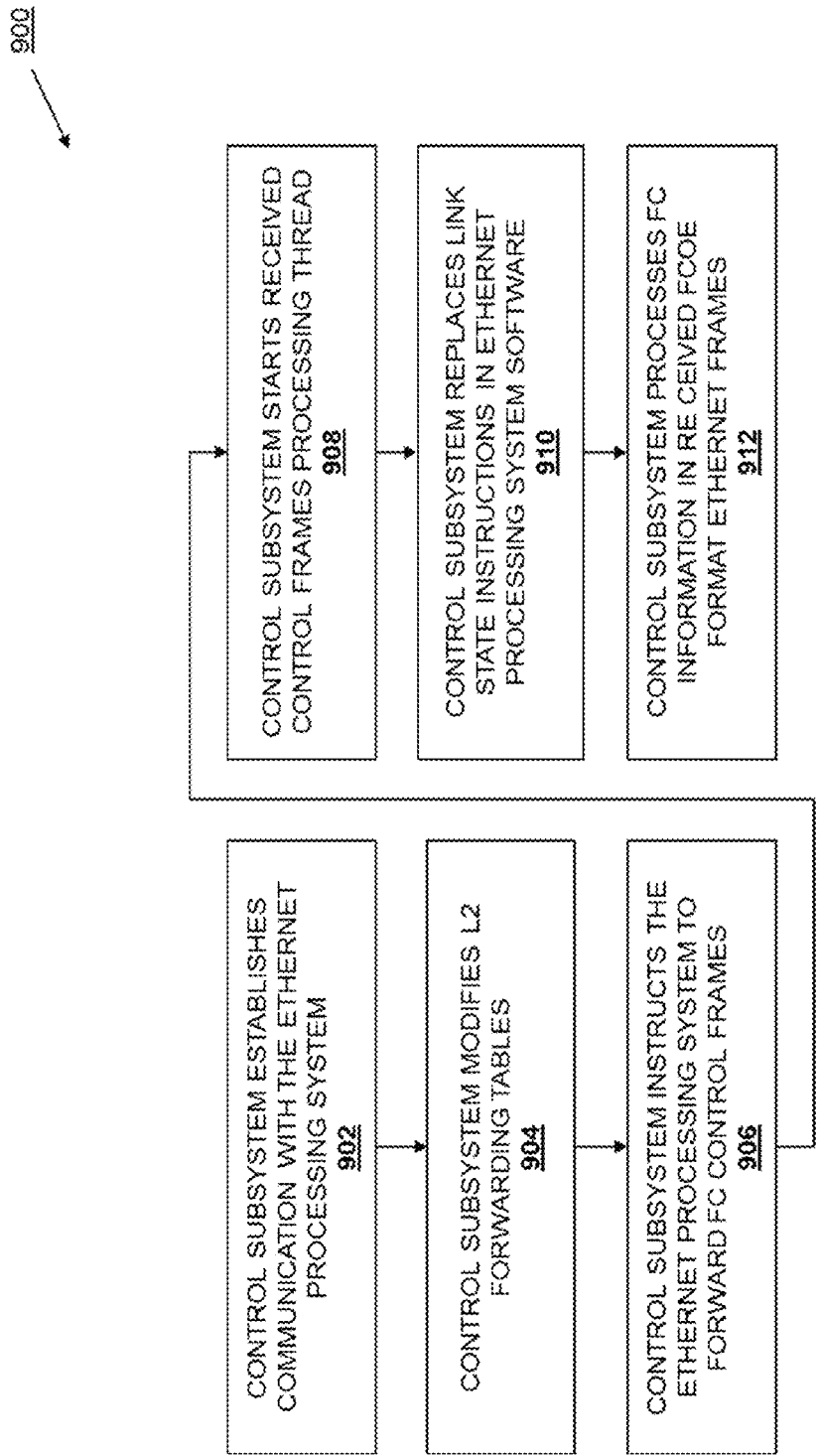
FIG. 9 is a flow chart illustrating an embodiment of a method for initializing a fabric services engine.

Referring now to FIG. 9, an embodiment of a method 900 for initializing a fabric services engine is illustrated. As discussed below, the method 900 describes a plurality of actions by a fabric services control subsystem that provide for the initialization of a conventional Ethernet switching hardware and software components and that operate to change the functioning of the Ethernet switching hardware and software to operate with the control subsystem to allow the processing of FC information in FCoE format Ethernet frames. In this manner, the Ethernet switch 800 (e.g., an Ethernet ASIC/switch chip) is programmed to create and handle FCoE "wrapped" FC messages and provide for Ethernet forwarding on a standard Ethernet switch chip ("merchant" silicon) as opposed to a proprietary FC switch chip. In specific examples, the fabric services engine 814 and method 900 have been utilized to change the functioning of a switching platform from operating as a standard 10 Gigabit-Ethernet (GE) Ethernet switch to operating as an 8 Gigabit FC switch.

The method 900 begins at block 902 where a control subsystem establishes communication with an Ethernet processing system. In an embodiment, the fabric services engine control subsystem 812 establishes communication with the Ethernet processing system 804 which may operate to establish communications between the CPU and the Ethernet switch chip in the Ethernet switch 800. The establishment of communications at block 902 may be performed in response to powering on, starting up, and/or otherwise beginning the initialization of the Ethernet switch 800, and thus may include a variety of initialization operations known in the art. In addition, at block 902, the establishment of communications may include opening Ethernet processing system user-to-kernel mode communications. In a specific example, the fabric service engine control subsystem 812 may perform operations to open up the software development kit (SDK) user-to-kernel communications for the Ethernet processing engine 804 by calling a bde_create command, and/or performing a variety of other operations that one of skill in the art in possession of the present disclosure would recognize would establish the communications at block 902.

The method 900 then proceeds to block 904 where the control subsystem modifies L2 forwarding tables. In an embodiment, the fabric services engine control subsystem 812 modifies the L2 forwarding tables 806 having entries that may have been provided for use by a conventional Ethernet switch chip to the L2 forwarding tables having entries used by the fabric services engine 814 as described below. In some embodiments, the modification of the L2 forwarding tables 806 at block 904 may include the fabric services engine control subsystem 802 removing default Ethernet entries from the L2 forwarding tables 806. For example, Bridge Protocol Data Units (BPDUs) that were provided in the L2 forwarding tables 806 for use by conventional Ethernet switches in communicating with each other may be removed from the L2 forwarding tables 806 in order to prevent the Ethernet switch 800 from performing communications with other Ethernet switches that can complicate the operations discussed below, as well as to provide additional storage space in the L2 forwarding tables 806 for the information discussed below, and/or to provide other benefits that would be apparent to one of skill in the art in possession of the present disclosure. As such, in some embodiments, default Ethernet multicast and broadcast entries (e.g., BPDUs and/or other information that conventionally cause the Ethernet switch 800 to forward multicast and broadcast packets) are removed from the L2 forwarding tables 806 at block 904 (such that multicast and broadcast packets received by the Ethernet switch 800 will be dropped).

In some embodiments, the modification of the L2 forwarding tables 806 at block 904 may include the fabric services engine control subsystem 802 setting the L2 forwarding tables 806 to remain persistent. One of skill in the art in possession of the present disclosure would recognize that the Ethernet protocol utilizes implicit learning, time out operations, and/or other Ethernet protocol features, while the FC protocol utilizes explicit learning (e.g., via the fabric logins discussed above) that would be adversely affected by Ethernet protocol operations, and thus the setting of the L2 forwarding tables 806 to remain persistent prevents Ethernet protocol operations such as time outs from adversely affecting the operations discussed below. In one example, at block 904 the fabric services engine control subsystem 802 may operate to turn off L2 entry aging so that entries in the L2 forwarding tables 804 stay programmed until they are explicitly replaced or deleted.

The method 900 then proceeds to block 906 where the control subsystem instructs the Ethernet processing system to forward FC control frames. In an embodiment, the fabric services engine control subsystem 812 provides instruction(s) to the Ethernet processing system 804 to forward FC control frames (e.g., frames that set up the transmission of FC data frames) to the fabric services engine control subsystem 812 as part of the modification of L2 forwarding tables 806 at block 904. For example, at block 906 the fabric services engine control subsystem 812 may replace the BPDUs that were removed from the L2 forwarding tables 806 with instructions to forward FC control frames to the fabric services engine control subsystem 812. As such, in some embodiments, default Ethernet multicast and broadcast entries in the L2 forwarding tables 806 may be replaced with FCoE versions of the FC WKA entries in order to cause control plane traffic to be captured and sent to the CPU/fabric services engine control system 812. For example, the modification of the L2 forwarding tables 806 at block 904 may include the fabric services engine control subsystem 802 adding FCoE formatted FC WKAs to the L2 forwarding tables 806 to configure the L2 forwarding tables 802 to allow the Ethernet processing system 804 to interact with an FC network by using those FCoE formatted FC WKAs to process FC information in FCoE format Ethernet frames. In some embodiments, at block 906 a receive callback handler may be registered in the fabric services engine control subsystem 812 for FC control frames (e.g., control frames addressed using the WKAs) received at the Ethernet processing system 804.

In a specific example, the removal of the default Ethernet entries at block 904 and the provisioning of the FC WKAs in the L2 forwarding tables at blocks 904 and 906 may be performed by initializing an L2 cache (that may be provided as part of the L2 forwarding tables 806) to remove all default Ethernet multicast and broadcast entries, and setting several new entries in the L2 cache for Fibre Channel WKA's. One of skill in the art in possession of the present disclosure will recognize that the L2 cache is a separate L2 lookup table that is resolved before, and takes precedent over, the normal Address Resolution Lookup (ARL) tables. These operations on the L2 cache may be used to provide all FC WKA traffic to the CPU/fabric services engine control subsystem 812 for FC stack code processing, and may be accomplished using pseudocode such as: bcm_l2_cache_init (DEFAULT_UNIT_NUMBER);

The size of the L2 cache may then be read back using pseudo code such as:

```
int cacheSize = 0;
bcm_l2_cache_size_get (DEFAULT_UNIT_NUMBER, &cacheSize);
```

The preloaded L2 cache entries may then be cleared out to, for example, prevent the Ethernet BPDU 01:80:c2:xx:xx:xx format frames from reaching the CPU/fabric services engine control subsystem 812 using pseudo code such as:

```
for (int cacheIndex = 0; cacheIndex < cacheSize; cacheIndex++)
    bcm_l2_cache_delete
    (DEFAULT_UNIT_NUMBER, cacheIndex);
```

The cleared entries may then be set to FCoE formatted FC WKA entries using pseudo code such as:

```
unsigned int maskIndex;
int actualIndexUsed = 0;
int l2Flags = BCM_L2_CACHE_CPU | BCM_L2_CACHE_BPDU;
```

One example of pseudo code for setting up C6 Multicast Server WKAs in the L2 cache is provided below:

```
bcm_l2_cache_addr_t c6McastServerCacheEntry;
bcm_l2_cache_addr_t_init (&c6McastServerCacheEntry);
c6McastServerCacheEntry.flags = l2Flags;
c6McastServerCacheEntry.mac[3] = C6_MCAST_SERVER.address[0];
c6McastServerCacheEntry.mac[4] = C6_MCAST_SERVER.address[1];
c6McastServerCacheEntry.mac[5] = C6_MCAST_SERVER.address[2];
```

-continued

```
for (maskIndex = 0; maskIndex < sizeof
(c6McastServerCacheEntry.mac_mask); maskIndex++)
c6McastServerCacheEntry.mac_mask[maskIndez] = 0xFF;
bcm_l2_cache_set       (DEFAULT_UNIT_NUMBER,
C6_MCAST_SERVER_L2_INIDEX, &c6McastServerCacheEntry,
&actualIndexUsed);
```

The method 900 then proceeds to block 908 where the control subsystem starts a received control frames processing thread. In an embodiment, the fabric services engine control subsystem 812 starts a received control frames processing thread (e.g., utilizing the Ethernet processing system software 810 and the Ethernet processing system 804) that is configured to process FC control frames and provide them to the fabric services engine control subsystem 812. In one example, the receive callback handler registered in the fabric services engine control subsystem 812 may be run as part of the received control frames processing thread.

The method 900 then proceeds to block 910 where the control subsystem replaces link state instructions in Ethernet processing system software. In an embodiment, the fabric services engine control subsystem 812 may replace first link state instructions in the Ethernet processing system software 810 with second link state instructions. For example, the first link state instructions in the Ethernet processing system software 810 may provide for "lossy" Ethernet behavior such as, for example, the dropping of frames due to noise when a link first comes up, while the second link state instructions may provide for "lossless" FC behavior that prevents the dropping of frames when a link comes up. As such, the replacement of the first link state instructions with the second link state instructions in the Ethernet processing system software 810 operates the change the behavior of the Ethernet switch 800 from Ethernet behavior to FC behavior (e.g., to make the Ethernet switch 800 operate similarly to an FC switch in that it frames are not dropped when a link comes up.) In a specific example the replacement of first link state instructions with second link state instructions at block 910 may include disabling a link state facility in the Ethernet processing system software 810, replacing a default link state change handler with a customer link state change handler that provides for the FC behavior discussed above, and then re-enabling the link state facility in the Ethernet processing system software 810.

The method 900 then proceeds to block 912 where the control subsystem processes FC information in received FCoE format Ethernet frames. In an embodiment, the fabric services engine control subsystem 812 may then begin processing FC information in FCoE format Ethernet frames that are received by the Ethernet processing system 804 through the communication system 816 by, for example, using the FC WKAs in the L2 forwarding tables 806 to forward those frames to their destination. For example, links may be established as discussed above to allow the Ethernet switch 800 receive FCoE formatted Ethernet frames, and the modifications made to the Ethernet switch 800 (i.e., the modifications made to the Ethernet processing system 804/ L2 forwarding tables 806 and the Ethernet processing system software 810) allow the fabric services engine control subsystem 812 to process the FC information in those FCoE formatted Ethernet frames. One of skill in the art in possession of the present disclosure will recognize that the ability to process the FC information in received FCoE formatted Ethernet frames allows the Ethernet switch 800 act as an FC switch rather than an Ethernet switch 800, while utilizing the Ethernet processing system 804/Ethernet ASIC/switch chip rather than a more expensive/proprietary FC switch chip.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An Ethernet switch, comprising:
   an Ethernet processing system;
   one or more layer two (L2) forwarding tables that are coupled to the Ethernet processing system;
   a memory system that is coupled to the Ethernet processing system and that includes Ethernet processing system software; and
   a control subsystem that is coupled to the Ethernet processing system, the L2 forwarding tables, and the memory system, wherein the control subsystem is configured to:
      establish communication with the Ethernet processing system;
      modify the one or more L2 forwarding tables by removing default Ethernet entries, adding Fibre Channel over Ethernet (FCoE) formatted FC well know addresses (WKAs), and setting the one or more L2 forwarding tables to remain persistent;
      instruct the Ethernet processing system to forward FC control frames to the control subsystem;
      replace first link state instructions in the Ethernet processing system software with second link state instructions to change Ethernet behavior to FC behavior; and
      process FC information in FCoE format Ethernet frames.

2. The Ethernet switch of claim 1, wherein the control subsystem is configured to instruct the Ethernet processing system to forward FC control frames to the control subsystem by replacing the default Ethernet entries with instructions to forward the FC control frames.

3. The Ethernet switch of claim 1, wherein the control subsystem is configured to:
   start a received control frames processing thread for processing control frames and providing the processed control frames to the control subsystem.

4. The Ethernet switch of claim 1, wherein the default Ethernet entries removed from the layer two (L2) forwarding tables include one or more multicast entries and one or more broadcast entries.

5. The Ethernet switch of claim 1, wherein the control subsystem is configured to replace the first link state instructions in the Ethernet processing system software with the second link state instructions by disabling a first link state handler in the Ethernet processing system software and providing a second link state handler in the Ethernet processing system software.

6. The Ethernet switch of claim 1, wherein the control subsystem is configured to instruct the Ethernet processing system to forward FC control frames to the control subsystem by registering a receive callback handler in the control subsystem for control frames received by the Ethernet processing system.

7. The Ethernet switch of claim 1, wherein the control subsystem is configured to establish communication with the Ethernet processing system by opening Ethernet processing system user-to-kernel mode communications.

8. An information handling system (IHS), comprising:
   a control processing system; and
   a control memory system including instructions that, when executed by the control processing system, cause the control processing system to:
      establish communication with an Ethernet processing system;
      modify the one or more L2 forwarding tables that are provided with the Ethernet processing system by removing default Ethernet entries, adding Fibre Channel over Ethernet (FCoE) formatted FC well know addresses (WKAs), and setting the one or more L2 forwarding tables to remain persistent;
      instruct the Ethernet processing system to forward FC control frames to the control processing system;
      replace first link state instructions in Ethernet processing system software that is provided with the Ethernet processing system with second link state instructions to Ethernet behavior to FC behavior; and
      process FC information in FCoE format Ethernet frames.

9. The IHS of claim 8, wherein the instructions, when executed by the control processing system, cause the control processing system to instruct the Ethernet processing system to forward FC control frames to the control subsystem by replacing the default Ethernet entries with instructions to forward the FC control frames.

10. The IHS of claim 8, wherein the default Ethernet entries removed from layer two (L2) forwarding tables include one or more multicast entries and one or more broadcast entries.

11. The IHS of claim 8, wherein the instructions, when executed by the control processing system, cause the control processing system to replace the first link state instructions in the Ethernet processing system software with the second link state instructions by disabling a first link state handler in the Ethernet processing system software and providing a second link state handler in the Ethernet processing system software.

12. The IHS of claim 8, wherein the instructions, when executed by the control processing system, cause the control processing system to instruct the Ethernet processing system to forward FC control frames to the control processing system by registering a receive callback handler in the control processing system for control frames received by the Ethernet processing system.

13. The IHS of claim 8, wherein the control processing system establishes communication with the Ethernet processing system by opening Ethernet processing system user-to-kernel mode communications.

14. A method for initializing a fabric services engine, comprising:
   establishing, by a control system, communication with an Ethernet processing system;
   modifying, by the control system, the one or more L2 forwarding tables that are provided with the Ethernet processing system by removing default Ethernet entries, adding Fibre Channel over Ethernet (FCoE) formatted FC well know addresses (WKAs), and setting the one or more L2 forwarding tables to remain persistent;
   instructing, by the control system, the Ethernet processing system to forward FC control frames to the control processing system;

replacing, by the control system, first link state instructions in Ethernet processing system software that is associated with the Ethernet processing system with second link state instructions to change Ethernet behavior to FC behavior; and processing, by the control system, FC information in FCoE format Ethernet frames.

15. The method of claim 14, further comprising:

instructing, by the control system, the Ethernet processing system to forward FC control frames to the control subsystem by replacing the default Ethernet entries with instructions to forward the FC control frames.

16. The method of claim 14, further comprising:

starting, by the control system, a received frames processing thread that processes control frames and provides the processed control frames to the control subsystem.

17. The method of claim 14, wherein the default Ethernet entries removed from layer two (L2) forwarding tables include one or more multicast entries and one or more broadcast entries.

18. The method of claim 14, further comprising:

replacing, by the control system, the first link state instructions in the Ethernet processing system software with the second link state instructions by disabling a first link state handler in the Ethernet processing system software and providing a second link state handler in the Ethernet processing system software.

19. The method of claim 14, further comprising:

instructing, by the control system, the Ethernet processing system to forward FC control frames to the control subsystem by registering a receive callback handler in the control subsystem for control frames received by the Ethernet processing system.

20. The method of claim 14, further comprising:

establishing, by the control system, communication with the Ethernet processing system by opening Ethernet processing system user-to-kernel mode communications.

* * * * *